US011675731B2

(12) United States Patent
Elkanovich et al.

(10) Patent No.: US 11,675,731 B2
(45) Date of Patent: Jun. 13, 2023

(54) DATA PROTECTION SYSTEM AND METHOD THEREOF FOR 3D SEMICONDUCTOR DEVICE

(71) Applicants: Global Unichip Corporation, Hsinchu (TW); Taiwan Semiconductor Manufacturing Company, Ltd., Hsinchu (TW)

(72) Inventors: Igor Elkanovich, Hsinchu (TW); Amnon Parnass, Hsinchu (TW); Pei Yu, Hsinchu (TW); Li-Ken Yeh, Hsinchu (TW); Yung-Sheng Fang, Hsinchu (TW); Sheng-Wei Lin, Hsinchu (TW); Tze-Chiang Huang, Hsinchu (TW); King Ho Tam, Hsinchu (TW); Ching-Fang Chen, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 206 days.

(21) Appl. No.: 17/037,749

(22) Filed: Sep. 30, 2020

(65) Prior Publication Data

US 2022/0058155 A1 Feb. 24, 2022

Related U.S. Application Data

(63) Continuation-in-part of application No. 16/999,055, filed on Aug. 20, 2020.

(51) Int. Cl.
*G06F 11/10* (2006.01)
*G06F 13/42* (2006.01)
*G06F 11/07* (2006.01)

(52) U.S. Cl.
CPC ........ *G06F 13/4291* (2013.01); *G06F 11/102* (2013.01); *G06F 11/1016* (2013.01); *G06F 11/1032* (2013.01); *G06F 11/0772* (2013.01)

(58) Field of Classification Search
CPC ............. G06F 11/0772; G06F 11/1016; G06F 11/102; G06F 11/1032
See application file for complete search history.

(56) References Cited

U.S. PATENT DOCUMENTS 5,701,409 A * 12/1997 Gates .................... G06F 11/261
714/48
5,978,934 A * 11/1999 Gates .................... G06F 11/261
714/E11.167

(Continued)

FOREIGN PATENT DOCUMENTS

GB 2476142 * 6/2011
KR 20140109206 * 9/2014

OTHER PUBLICATIONS

Wikipedia's Through-Silicon via historical version published Jun. 28, 2020 https://en.wikipedia.org/w/index.php?title=Through-silicon_via&oldid=964967483 (Year: 2020).*

(Continued)

*Primary Examiner* — Joseph O Schell
(74) *Attorney, Agent, or Firm* — JCIPRNET

(57) ABSTRACT

A data protection system and a data protection method for handling an errored command are provided. The data protection system includes a master device and a slave device. The master device is configured to send command. The slave device is coupled to the master device. The save device is configured to receive the command from the master device. The master device includes a master interface. The slave device includes a slave interface. The master interface and the slave interface are electrically connected via one or plurality of bonds and/or TSVs and configured for interfac- (Continued)

ing between the master device and the slave device. The errored command represents the command having a parity or other error. The slave device is further configured to receive the errored command and to respond the errored command according to read or write operation.

20 Claims, 10 Drawing Sheets

(56) References Cited

U.S. PATENT DOCUMENTS

| | | | |
|---|---|---|---|
| 6,049,894 | A | 4/2000 | Gates |
| 6,373,819 | B1* | 4/2002 | Lundh .................. H04L 1/241 |
| | | | 370/244 |
| 8,743,582 | B2 | 6/2014 | Kang et al. |
| 9,245,827 | B2 | 1/2016 | Kang et al. |
| 9,389,953 | B2 | 7/2016 | Choi et al. |
| 9,530,442 | B1 | 12/2016 | Hassner et al. |
| 10,592,448 | B2 | 3/2020 | Chang |
| 10,644,826 | B2 | 5/2020 | Wuu et al. |
| 2008/0147964 | A1 | 6/2008 | Chow et al. |
| 2011/0041039 | A1* | 2/2011 | Harari ................ G06F 11/1068 |
| | | | 713/193 |
| 2014/0372791 | A1* | 12/2014 | Adachi ............... G06F 11/1048 |
| | | | 714/5.1 |
| 2018/0219562 | A1* | 8/2018 | Lee ........................ H03M 13/09 |
| 2019/0213164 | A1 | 7/2019 | Kwon et al. |
| 2019/0258539 | A1* | 8/2019 | Zhu .................... G06F 13/1668 |
| 2019/0258555 | A1* | 8/2019 | Ngo .................... G06F 13/3625 |
| 2019/0347159 | A1 | 11/2019 | Chang et al. |
| 2019/0385693 | A1* | 12/2019 | Shin ....................... G11C 29/42 |
| 2020/0168527 | A1 | 5/2020 | Chang et al. |
| 2021/0303372 | A1* | 9/2021 | Santoni .............. G06F 11/1004 |

OTHER PUBLICATIONS

"Notice of Allowance of U.S. Appl. No. 17/037,739", dated Apr. 5, 2021, pp. 1-11.
"Office Action of Taiwan Counterpart Application", dated Mar. 31, 2021, p. 1-p. 4.

* cited by examiner

DATA PROTECTION SYSTEM AND METHOD THEREOF FOR 3D SEMICONDUCTOR DEVICE

CROSS-REFERENCE TO RELATED APPLICATION

This application is a continuation-in-part application of and claims priority benefit of U.S. application Ser. No. 16/999,055, filed on Aug. 20, 2020, now pending. The entirety of the above-mentioned patent application is hereby incorporated by reference herein and made a part of this specification.

BACKGROUND

Technical Field

The disclosure relates to a technology for a 3D semiconductor device, and more particularly a data protection system and a data protection method for the 3D semiconductor device.

Description of Related Art

In recent years, a 3D semiconductor technology has emerged. By utilizing this technology, various semiconductor devices including CPUs and memories can be integrated into a single chip. The integration of the CPUs and the memories is performed by interconnecting the CPUs and the memories vertically. The structure of interconnecting the CPUs and the memories vertically is generally called as a 3D integrated circuit (3D IC). By implementing the 3D IC, the size of the electronic device becomes compact and the production cost can be reduced accordingly. On the other hand, in order to create the 3D IC, the interface and corresponding interconnections between, for example, the CPU and the memories needs to be created and regulated. Recently, some interfaces and corresponding interconnections have been proposed. However, since the 3D IC integrates the CPU and the memories into one system, the data communication between the CPU and the memories becomes more complicated. In addition, more data transceived between the CPU and the memories, the probability of error in the transceived data becomes higher. Therefore, the system and method which is able to distinguish between the good data and the errored data and further able to handle the errored data becomes crucial. However, the reliable system and method to address this issue is still under development.

SUMMARY

The disclosure provides a data protection system and a data protection method for a 3D semiconductor device. The data protection system provides reliable data communication between the master device and the slave device.

In an embodiment, the disclosure provides a data protection system for handling an error command. The data protection system includes a master device and a slave device. The master device is configured to send command. The slave device is coupled to the master device and configured to receive the command from the master device. The master device includes a master interface, the slave device includes a slave interface, and the master interface and the slave interface are electrically connected via one or plurality of bonds and/or trough-silicon-vias (TSVs) and configured for interfacing between the master device and the slave device. The errored command represents the command having a parity error. The slave device is further configured to receive the errored command and to respond the errored command according to read or write operation.

In an embodiment, the disclosure further provides a data protection method for handling an errored command. A master device includes a master interface, a slave device includes a slave interface, and the master interface and the slave interface are electrically connected via one or plurality of bonds and/or TSVs and configured for interfacing between the master device and the slave device. The data protection method includes sending command by a master interface and receiving, by a slave interface, the command from the master device. The errored command represents the command having a parity error. Receiving the errored command and responding the errored command by the slave device are performed according to read or write operation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
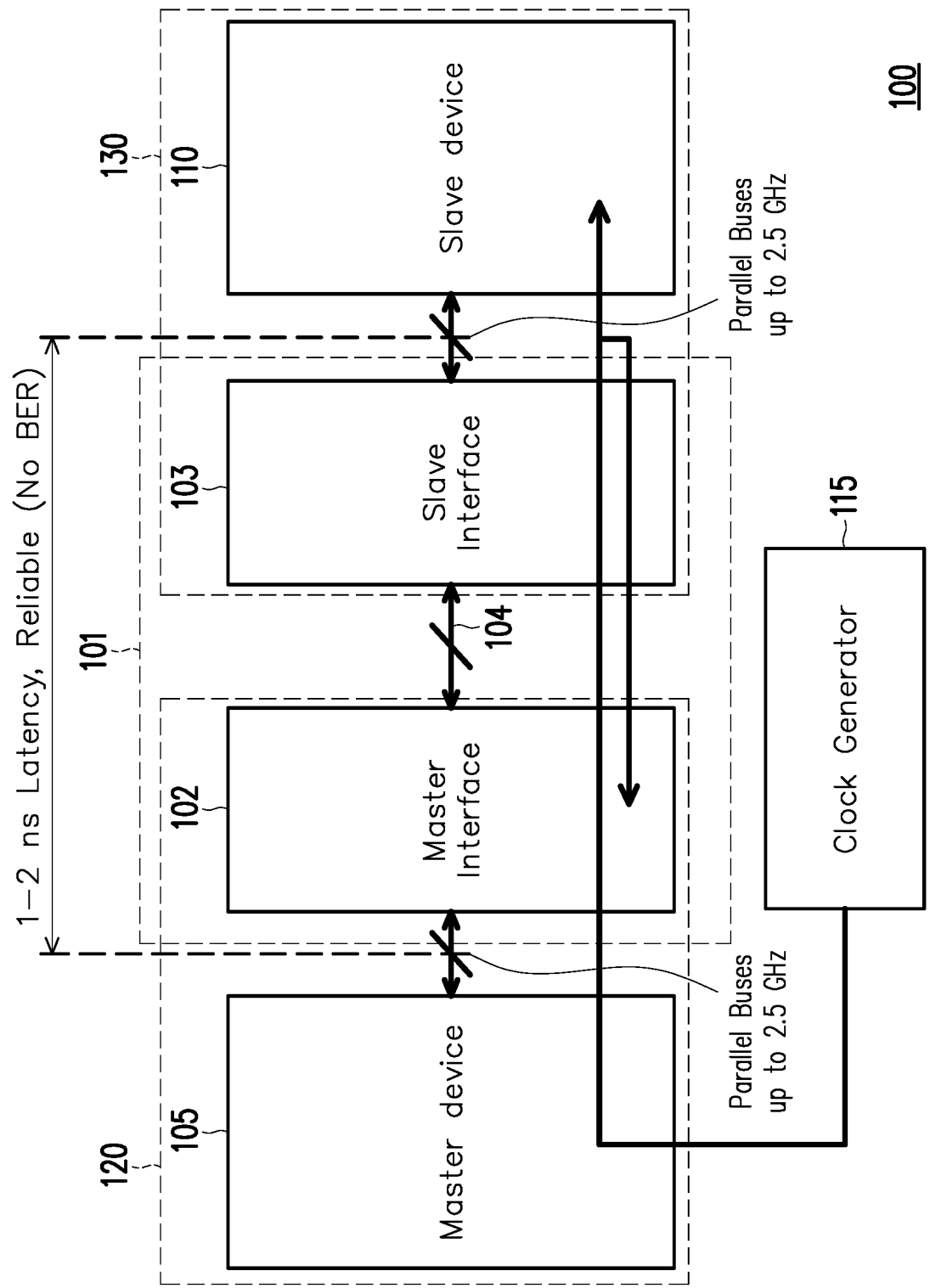
FIG. 1 schematically illustrates a block diagram of a data protection system including a master device and a slave device according to an embodiment of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure discloses a data protection system and a data protection method for a 3D semiconductor device. The data protection system provides reliable data communication between the master device and the slave device. The reliable data communication is generated by distinguishing between the correct data and the error data. The data protection system further handles the error data by specific method, as such, the data protection system is able to respond appropriately in condition when the error data occurs. By responding the error data appropriately, the reliable transceived data can be maintained and the reliable data communication is able to be achieved accordingly.

For instance, the data protection system of the 3D IC includes the processor and the plurality of memories. The data communication between the processor and the plurality of memories includes write operation and read operation. For example, during read operation, the processor sends the command to one memory, and the memory receives the command accordingly. However, the command received by the memory is not always the same as the command send by the processor. In condition when the command received by the memory is different with the command sent by the processor, the error has occurred. Therefore, the memory needs a mechanism to check whether or not the command received by the memory is the same with the command sent by the processor. The checking mechanism is performed, for example, by detecting the parity error of the command received by the memory. If there is the parity error in the command received by the memory, the command received by the memory is different with the command sent by the processor. In this condition, the memory send the intentional error data to the processor, and the processor receives and responds the intentional error data as the same as the error data. Since the processor receives the intentional error data, the processor realizes that the error in the command received by the memory has occurred. By realizing this condition, the processor and the memory perform the corresponding interrupt to the data protection system. On the other hand, in condition when the error in the command received by the memory has occurred but the memory does not send the intentional error data to the processor, the processor does not realize that the error to the command received by the memory has occurred. Accordingly, when the memory does not send the data or the intentional error data to the processor in response to the command sent by the processor, the processor lost one data. Therefore, the read operation to the plurality of data in response to the plurality of command sent by the processor will get wrong. Specifically, the data protection system and method for the 3D IC in both write operation and read operation will be elaborated as follows.

FIG. 1 schematically illustrates a block diagram of a semiconductor device including a master device and a slave device according to an embodiment of the disclosure. The semiconductor device 100 is implemented in 3D packaging such as chip-on-wafer-on-substrate (CoWoS), system-on-integrated-chip (SoIC), wafer-on wafer (WoW), and other 3D packaging integrations.

Referring to FIG. 1, the data protection system 100 includes a master die 120, a slave die 130, and a clock generator 115. The master die 120 is coupled to the slave die 130 by a trough-silicon-via (TSV) 104. The master die 120 includes the master device 105 and the master interface 102 which is coupled to the master device 105. On the other side, the slave die 130 includes the slave device 110 and the slave interface 103 which is coupled to the slave device 110. The master device 105 is coupled to the slave device 110 via the master interface 102 and the slave interface 103. The master interface 102 and the slave interface 103 is coupled via the TSV 104 and integrated together as the interface apparatus 101. The interface apparatus 101 is suitable to connect the master device 105 and the slave device 110 vertically which forms a 3D semiconductor device. The structure of the interface apparatus 101 is called as a Glink-3D. Moreover, the clock generator 115 generates a clock which drives the master device 105, the master interface 102, the slave interface 103, and the slave device 110. The clock generated by the clock generator 115 is used for the master interface 102 and the slave interface 103 in forward and backward directions.

In the embodiment, the master device 105 and the slave device 110 are implemented as, for example, a processor and a memory (i.e., SRAM) respectively. The clock generator 115 is implemented by, for example, an oscillator. The connection between the master interface 102 and the slave interface 103 is implemented by the TSVs having parallel buses used to transfer the data with sampling rate up to 5.0 Gbps or 2.5 GHz of double data rate (DDR). Parallel buses are also used to couple between the slave device 110 and the slave interface 103 and also master device 105 and the master interface 102. In the embodiment, the latency between the master device 105 and the slave device 110 is set to 1-2 ns. Data transfer between the salve device 105 and the slave device 110 has low or no bit error (no BER).

Figure 2:
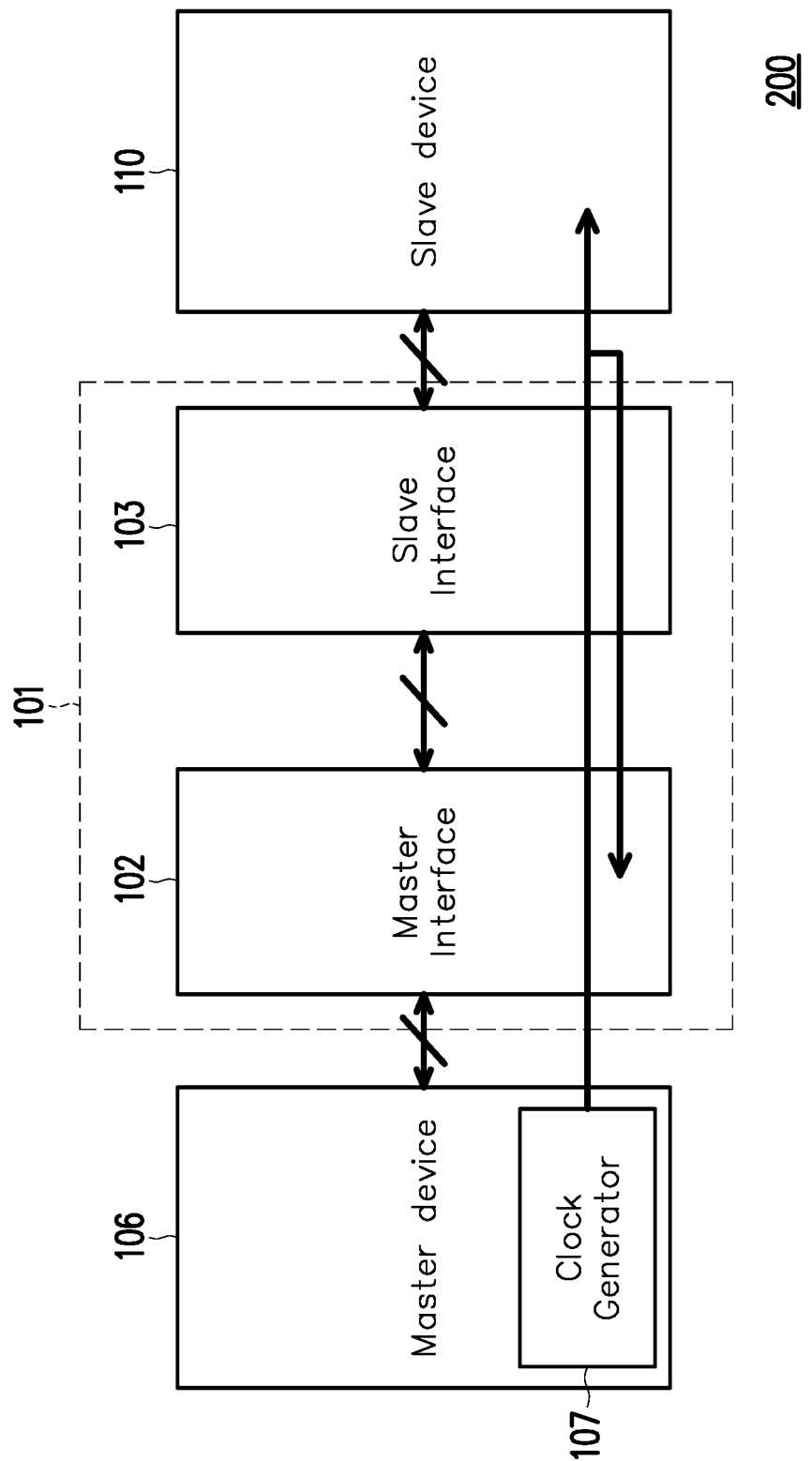
FIG. 2 schematically illustrates a block diagram of a data protection system including a master device and a slave device according to an embodiment of the disclosure.

FIG. 2 schematically illustrates a block diagram of a data protection system including a master device and a slave device according to an embodiment of the disclosure. The data protection system 200 illustrated in FIG. 2 is similar as the data protection system 100 illustrated in FIG. 1. The difference is that the clock generator 107 is implemented inside the master device 106 instead of implemented as the external clock generator as shown in FIG. 1.

Figure 3:
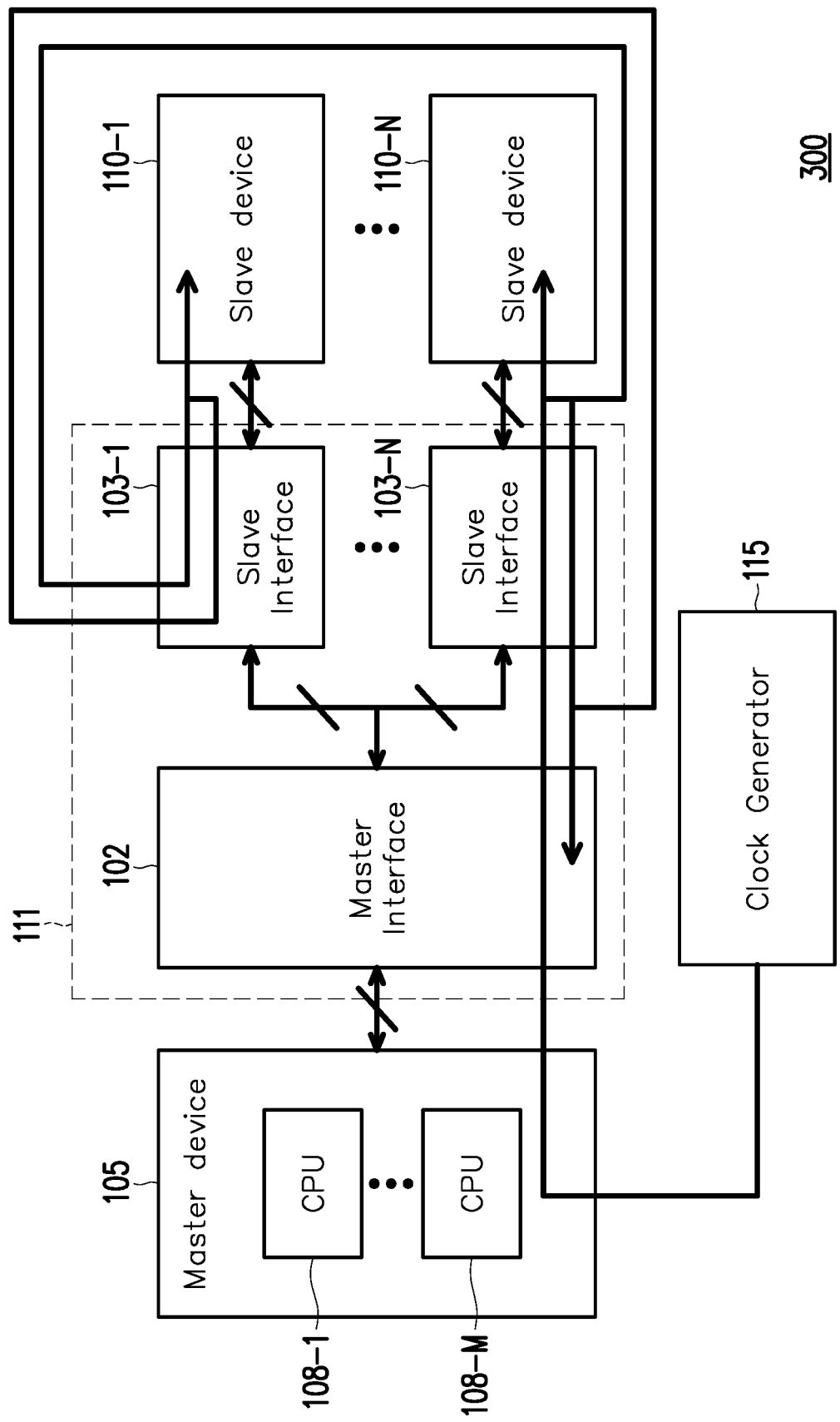
FIG. 3 schematically illustrates a block diagram of a data protection system including a master device and a plurality of slave devices according to an embodiment of the disclosure.

FIG. 3 schematically illustrates a block diagram of a data protection system including a master device and a plurality of slave devices according to an embodiment of the disclosure. The data protection system 300 illustrated in FIG. 3 is similar as the data protection system 100 illustrated in FIG. 1. The difference is that the master device 105 includes a plurality of central processing units (CPUs) 108-1 to 108-M. Moreover, the interface apparatus 111 includes the master interface 102 and a plurality of slave interfaces 103-1 to 103-N. Each slave interface 103-1 to 103-N is coupled to each slave device 110-1 to 110-N in one-to-one relationship. N and M are integer numbers equal to or greater than 1. Furthermore, the clock generator 115 generates the clock which is used to drive the master device 105 having the plurality of CPUs 108-1 to 108-M, the master interface 102, the plurality of slave interfaces 103-1 to 103-N, and the plurality of slave devices 110-1 to 110-N. Clock generator 115 can be included to master device 105 as in FIG. 2.

Figure 4:
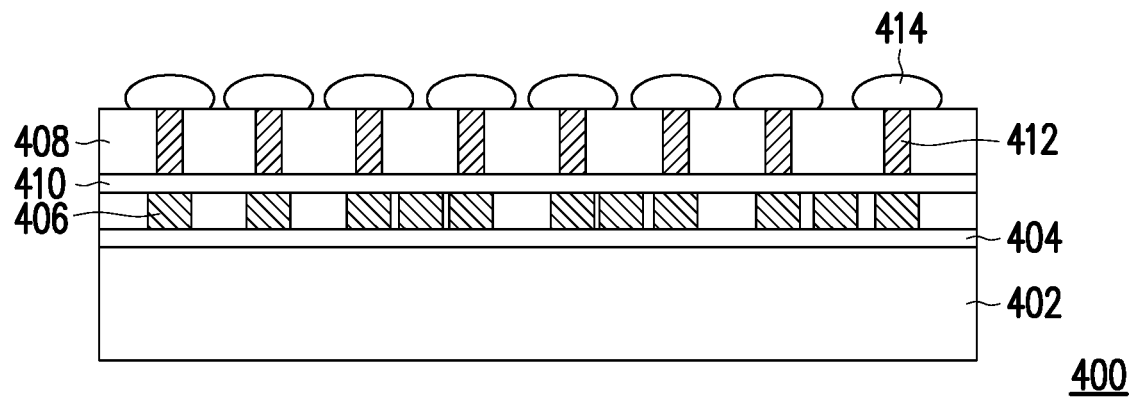
FIG. 4 schematically illustrates a design diagram of a data protection system including a master die and a slave die according to an embodiment of the disclosure.

FIG. 4 schematically illustrates a design diagram of a data protection system including a master die and a slave die according to an embodiment of the disclosure. The data protection system 400 is arranged vertically forming the 3D packaging and includes, for example, the master/processor/chip 1 die 402 coupled with the master interface 404, the slave/memory/chip 2 die 408 coupled with the slave interface 410. The processor die 402 and the memory die 408 are coupled by the plurality of TSVs 406 via the processor interface 404 and the memory interface 410. Moreover, the memory die 408 includes the plurality of TSVs 412 and the plurality of connections 414.

Figure 5:
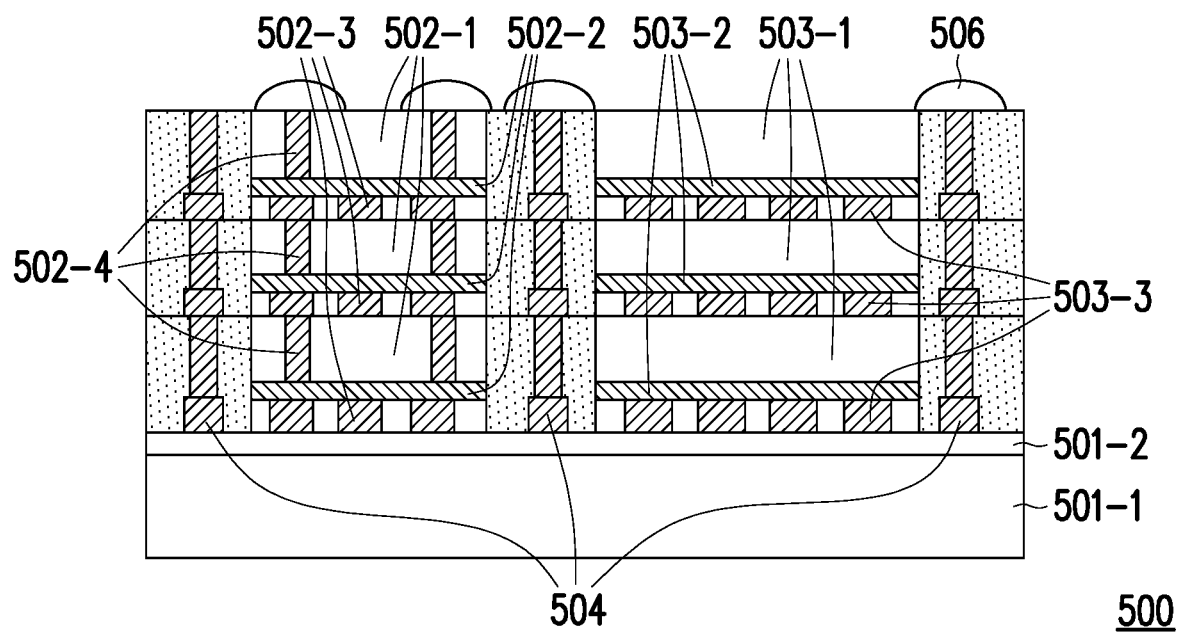
FIG. 5 schematically illustrates a design diagram of a data protection system including a master die and a plurality of slave dies according to an embodiment of the disclosure.

FIG. 5 schematically illustrates a design diagram of a data protection system including a master die and a plurality of slave dies according to an embodiment of the disclosure. The data protection system 500 is arranged vertically forming the 3D packaging and includes, for example, a master die 501-1 coupled to the master interface 501-2, the plurality of first slave dies 502-1 coupled to the plurality of first slave interfaces 502-2, and the plurality of second slave dies 503-1 coupled to the plurality of second slave interfaces 503-2. The plurality of first slave dies 502-1 include the TSVs 502-4. The master interface 501-2 is coupled to the plurality of first slave interfaces 502-2 via the TSVs 502-3 and coupled to the plurality of second slave interfaces 503-2 via the TSVs 503-3. Moreover, the data protection system includes the TSVs connections 504 connecting the master interface 501-2 to the connections 506.

In the embodiment, the data protection system (i.e., 500) supports face-to-face and face-to-back interfaces. For example, the interface between the master die 501-1 and the first slave die 502-1 and/or between the master die 501-1 and the second slave die 503-1 are the face-to-face interface. And the face-to-back interface is used for the interface between each first slave die 502-1 and/or between each second slave die 503-1.

Figure 6:
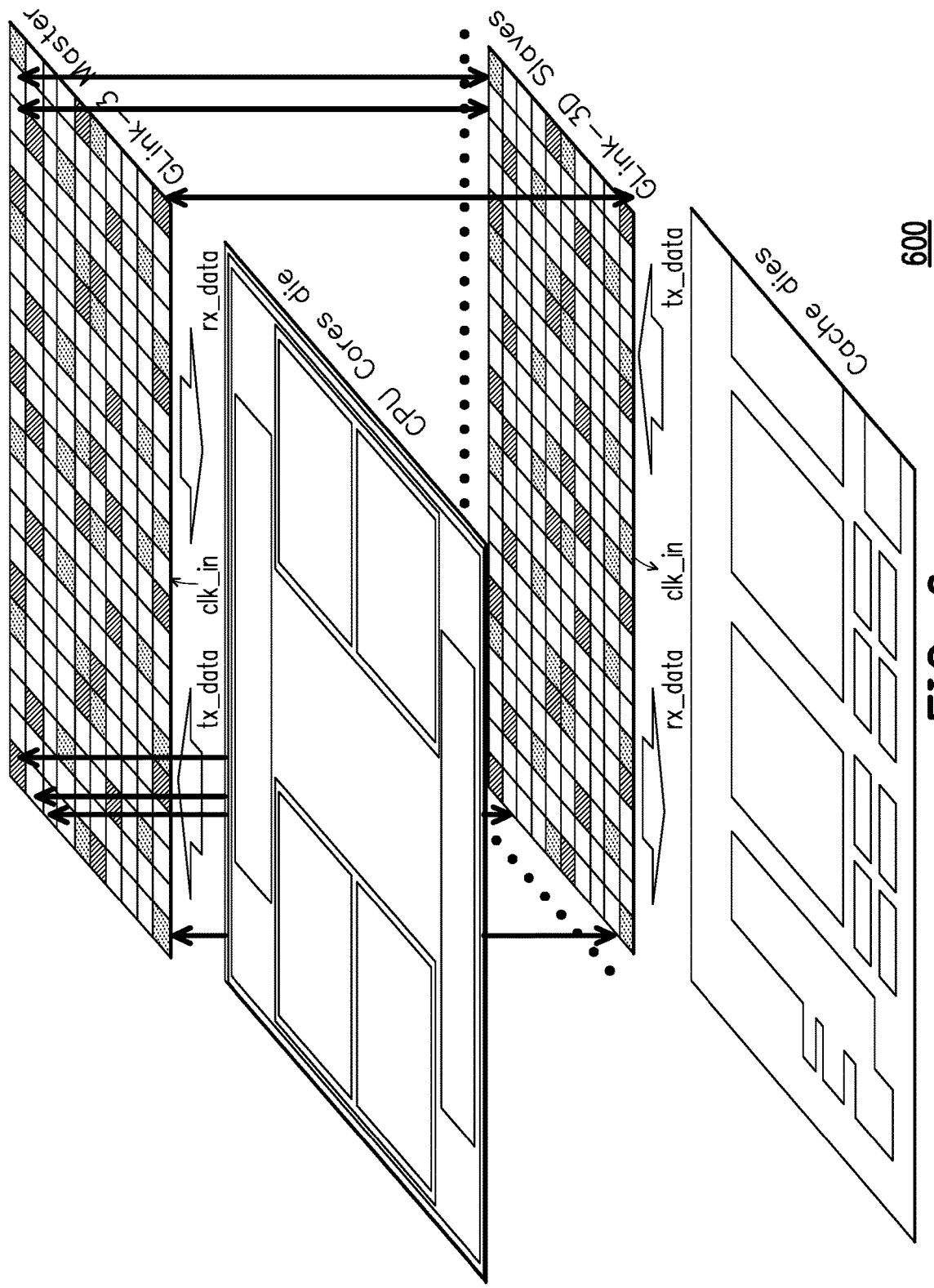
FIG. 6 schematically illustrates a 3D diagram of a data protection system including an example of an interface apparatus structure according to an embodiment of the disclosure.

FIG. 6 schematically illustrates a 3D diagram of a data protection system including an example of an interface apparatus structure according to an embodiment of the disclosure. The data protection system 600 includes a CPU cores die coupled to the Glink-3D master as the master interface and cache dies coupled to the Glink-3D slaves as the slave interfaces. The Glink-3D master is coupled to the Glink-3D slaves via TSVs. During, for example, read operation, the CPU cores die send command to the cache dies via the Glink-3D master and Glink-3D slaves. And then, the cache dies receive the command from the CPU cores die. The cache dies generate data according to the command and send the data to the CPU cores die via the Glink-3D slaves and Glink-3D master. Finally, the CPU cores die receives the data from the cache dies. Moreover, the data communication between the CPU cores die and the cache dies via the Glink-3D master and Glink-3D slaves is driven by the clock generated by the clock generator (i.e., 115).

In this embodiment, the Glink-3D master and the Glink-3D slaves have identical structure and connected in one-to-one relationship. For example, each Glink-3D master and Glink-3D slaves include a plurality of blocks. Each block is divided into a plurality of cells, for example, 5×5 cells. Each cell of the Glink-3D master is connected to each cell of the Glink-3D slaves in one-to-one relationship via the TSV. This Glink-3D structure is used as a physical layer for, for example, an advance microcontroller bus architecture coherent hub interface (AMBA CHI) protocol. The details and corresponding implementations of the interface apparatus including the Glink-3D master and the Glink-3D slaves on the 3D semiconductor device will be further described as follows.

Figure 7:
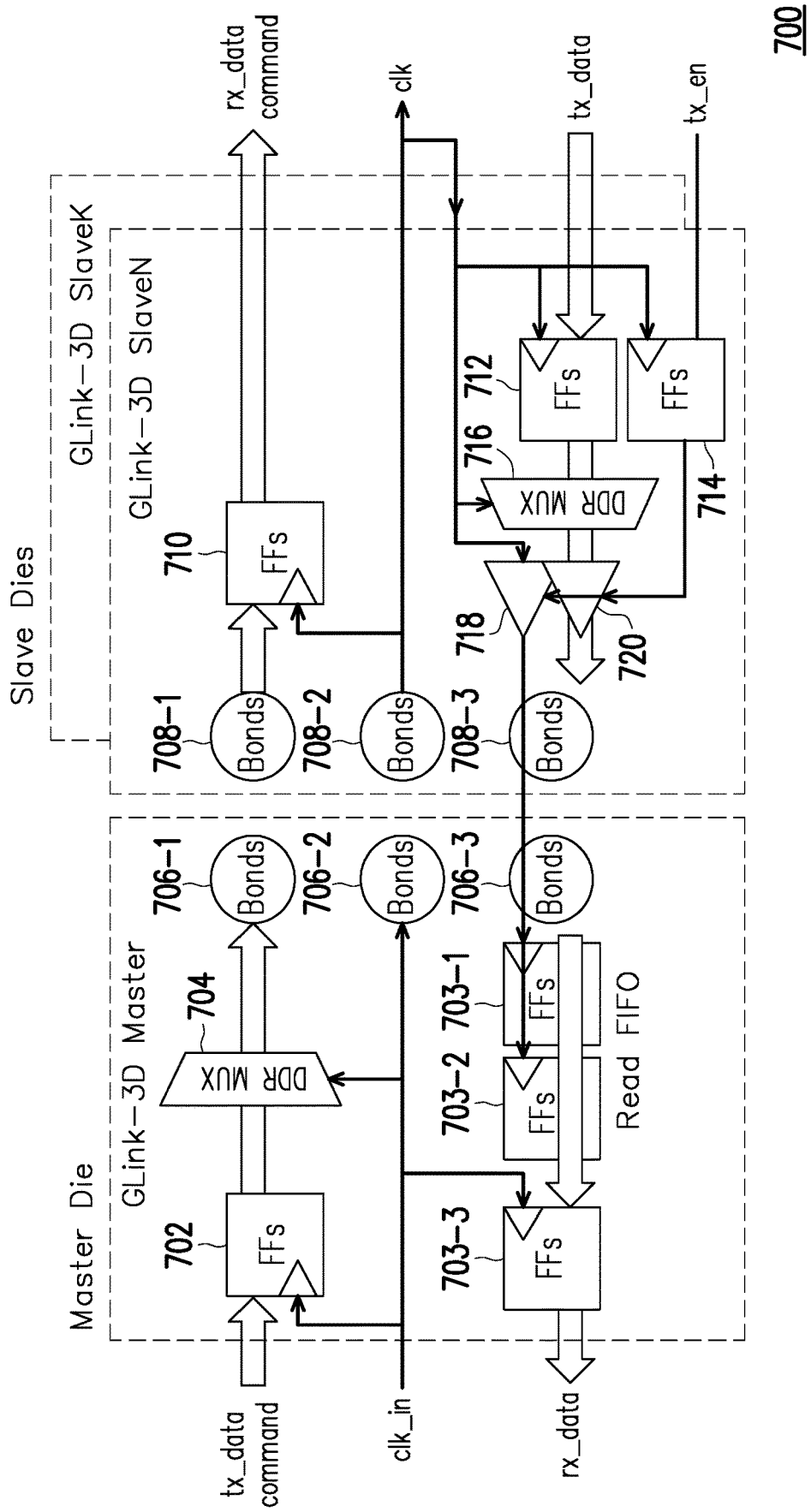
FIG. 7 schematically illustrates a schematic diagram of an interface apparatus including a master interface and a plurality of slave interfaces according to an embodiment of the disclosure.

FIG. 7 schematically illustrates a schematic diagram of an interface apparatus including a master interface and a plurality of slave interfaces according to an embodiment of the disclosure. The schematic diagram 700 may be implemented by using a plurality of electronic components, i.e., flip-flops (FFs), multiplexers (MUXs), inverters, and buffers.

Referring to FIG. 7, Glink-3D master is used as interface for the master die. The Glink-3D slaveK and the Glink-3D slaveN are used as interfaces for the slaveK die and the slaveN die respectively. The Glink-3D master, the Glink-3D slaveK, and the Glink-3D slaveN are driven by the clock clk_in generated by the clock generator (i.e., 115). The Glink-3D master, the Glink-3D slaveK, and the Glink-3D slaveN are electrically connected by one or plurality of bonds and/or TSVs. For example, the Glink-3D master bonds 706-1 to 706-3 are connected to the Glink-3D slaveN bonds 708-1 to 708-3 in one-to-one relationship by using the TSVs.

In this embodiment, the Glink-3D master includes the FFs 702, the DDR MUX 704, the bonds 706-1 to 706-3, and the read first-in-first-out (FIFO) including a plurality of FFs 703-1 to 703-3. The FFs 702 is coupled to the DDR MUX 704 and receives the command tx_data command from the master die. The command tx_data command may includes a slave_ID which is used as a slave die address. The DDR MUX 704 is coupled to the bond 706-1 and proceed the command tx_data command to the Glink-3D slaveN via the bonds 706-1 and 708-1 in form of the DDR data format. The FFs 703-1 is coupled to the FFs 703-2 and the bonds 706-3. The FFs 703-3 is coupled to the FFs 703-2 and the master die and send the data rx_data to the master die. The FFs 702, the DDR MUX 704, the bonds 706-2, and the FFs 703-3 are driven the clock generator (i.e., 115) generating clk_in. The FFs 703-1 and 703-2 are driven by the local clock generated by, for example, the Glink-3D slaveN via the bonds 706-3 and 708-3.

In this embodiment, the Glink-3D slaveN includes the bonds 708-1 to 708-3, the FFs 710 to 714, the DDR MUX 716, and the buffers 718 and 720. The bonds 708-1 is coupled to the bonds 706-1 and the FFs 710 sending the command rx_data command to the slaveN die. The bonds 708-2 is coupled to the bonds 706-2 and send the clock clk to the slaveN die. The FFs 712 is coupled to DDR MUX 716 and the slaveN die and receives the data tx_data from the slaveN die. The FFs 714 is coupled to the slave N die and receives the enable signal tx_en. The buffer 720 is coupled to the DDR MUX 716 and the bonds 708-3 and send the data tx_data in form of DDR data format. The buffer 718 is coupled to the bonds 708-3 and send the local clock to the Glink 3D master via the bonds 708-3 and 706-3. The FFs 710 to 714 and the DDR MUX 716 is driven by clock clk. The buffers 718 and 720 are driven by the enable signal tx_en. In addition, the slaveK dies and the corresponding Glink-3D slaveK have the same structure and data communication as the slaveN die and the Glink-3D slaveN. The difference between the Glink-3D slaveN and the Glink-3D slaveK is located in the generating of the local clocks.

Figure 8:
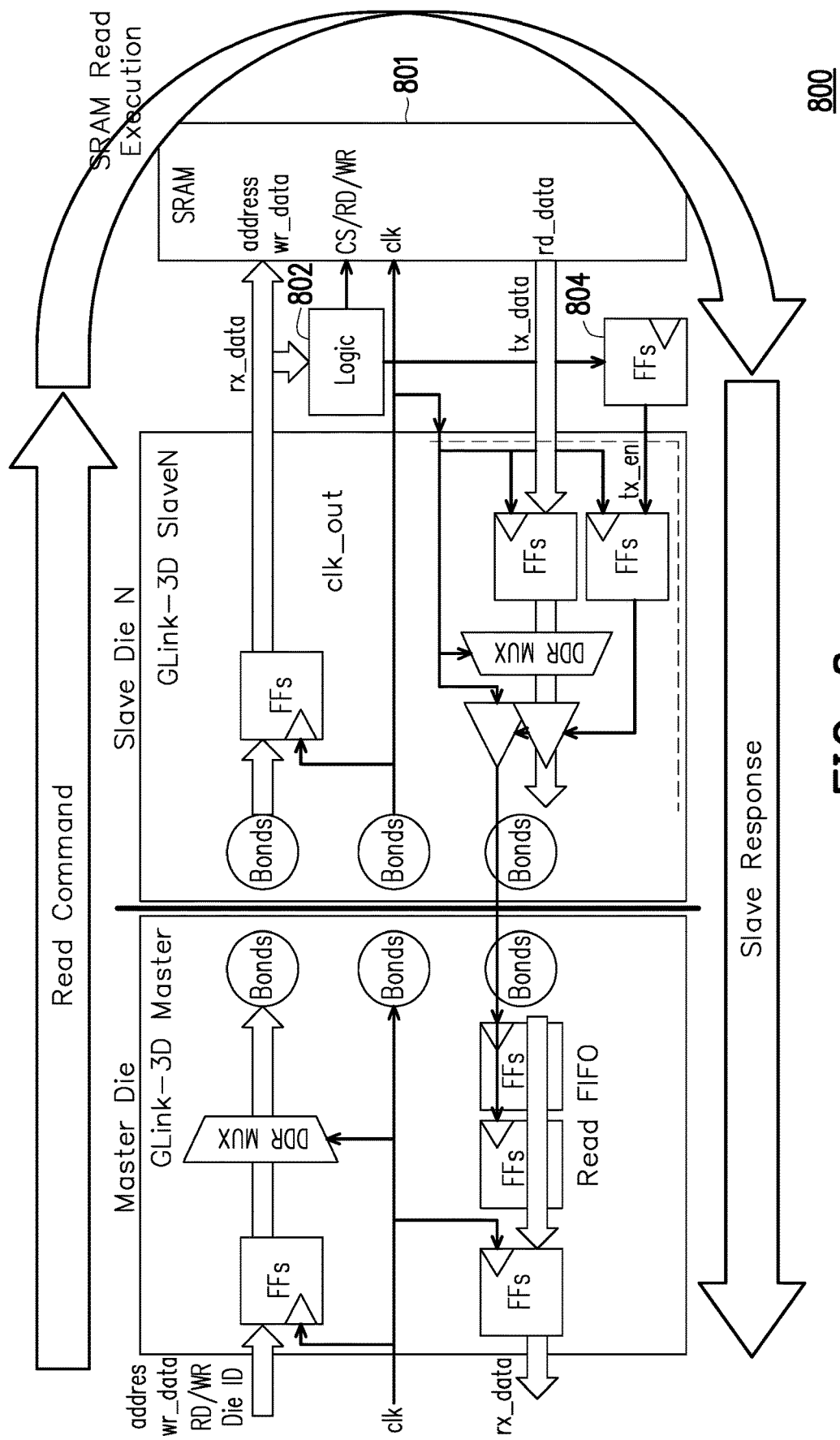
FIG. 8 schematically illustrates a schematic diagram of an interface apparatus including a master die and a slave die during a read operation according to an embodiment of the disclosure.

FIG. 8 schematically illustrates a schematic diagram of an interface apparatus including a master die and a slave die during a read operation according to an embodiment of the disclosure. The schematic diagram 800 is similar with the schematic diagram 700. The difference between the schematic diagrams 800 and 800 is that the schematic diagram 800 shows, for example, one slaveN die with corresponding Glink-3D slaveN and the SRAM 801. In addition, the logic unit 802 and the FFs 804 are included.

Referring to FIG. 8, during read operation, the master die sends to the SRAM 801 via the Glink-3D master and the Glink-3D slaveN the command wr_data including the die ID which is the address of the slave die N. The logic unit 802 is coupled to the Glink-3D slaveN, the SRAM 801, and the FFs 804. The FFs 804 is coupled to the Glink-3D slaveN. The logic unit 802 generates the signal used to choose between the chip select (CS) command, the read (RD) command, or the write (WR) command. The logic unit 802 with corresponding FFs 804 generate the enable signal tx_en. The SRAM 801 generates the data tx_data according to the command. The Glink-3D slaveN sends the data tx_data to the Glink-3D master in form of DDR data format. The master die reads the data rd_data according to its local clock clk.

In the embodiment, the data protection system handles the errored command. For instance, the processor 105 sends the command to the slaveN device via the Glink-3D master and the Glink-3D slaveN. Since, the data communication between the processor 105 and the slaveN device may be interfered with external factors (i.e., noise), the command sent by the processor 105 may be changed. Therefore, the slaveN device receives the command having different value than the command sent by the processor 105. The command having different value than the command sent by the processor 105 is called as the errored command.

Figure 9:
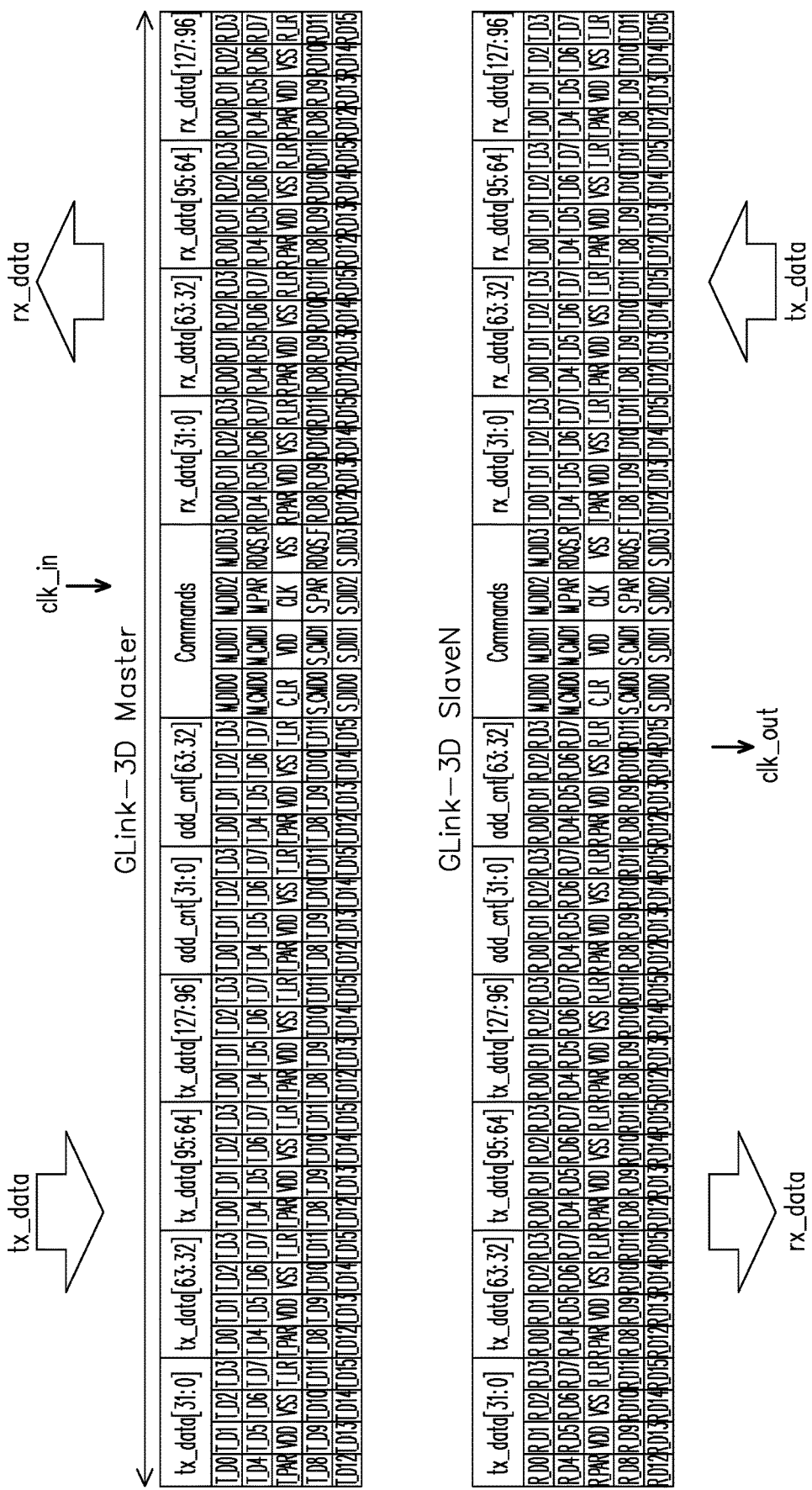
FIG. 9 schematically illustrates a bonds map of the interface apparatus including a master interface and a slave interface according to an embodiment of the disclosure.

FIG. 9 schematically illustrates a bonds map of the interface apparatus including a master interface and a slave interface according to an embodiment of the disclosure. The bonds map 900 shows the mapping of bonds between, for example, the Glink-3D master and the Glink-3D slaveN. Each bond in the Glink-3D master is electrically connected to the Glink-3D slaveN via the TSV in one-to-one relationship. The Glink-3D master receives the command from the processor 105. Accordingly, the Glink-3D master is driven by the clock clk_in generated by the clock generator 115. And then, the Glink-3D slaveN sends the command to the slaveN device. Accordingly, the Glink-3D slaveN sends the clock clk_out to the slaveN. The Glink-3D slaveN receives the data from the slaveN. And then, the Glink-3D master sends the data to the processor 105.

In this embodiment, the errored command represents the command having a parity error. For example, the Glink-3D master includes four transmitted data blocks, two address data blocks, one command data block, and four received data blocks. Each block includes 4×5 (20) bonds. Each bond represents one bit connection. On the other hand, the Glink-3D slaveN includes four received data blocks, two address data blocks, one command data block, and four transmitted data blocks. Each block includes 4×5 (20) bonds. Each bond represents one bit connection. Each bond of the Glink-3D master is electrically connected to each bond of the Glink-3D slaveN in one-to-one relationship.

For example, the command data block of the Glink-3D master includes 4 bits of master-to-slave ID (M_DID0 to M_DID3), 2 bits of read/write (R/W) command (M_CMD0, M_CMD1), 1 bit of parity (M_PAR), 2 bits of local clock (RDQS_R, RDQS_F), 1 bit of lane repair (C_LR), 2 bits of voltage (VDD, VSS), 1 bit of clock (CLK), 4 bits of slave-to-master ID (S_DID0 to S_DID3), 2 bits of read/write (R/W) command (S_CMD0, S_CMD1), and 1 bit of parity (S_PAR). On the other hand, the command data block of the Glink-3D slaveN is identical with the command data block of the Glink-3D master. The command data block of the Glink-3D slaveN includes 4 bits of master-to-slave ID (M_DID0 to M_DID3), 2 bits of read/write (R/W) command (M_CMD0, M_CMD1), 1 bit of parity (M_PAR), 2 bits of local clock (RDQS_R, RDQS_F), 1 bit of lane repair (C_LR), 2 bits of voltage (VDD, VSS), 1 bit of clock (CLK), 4 bits of slave-to-master ID (S_DID0 to S_DID3), 2 bits of read/write (R/W) command (S_CMD0, S_CMD1), and 1 bit of parity (S_PAR).

The one-to-one relationship between each bond of the Glink-3D master and, for example, the Glink-3D slaveN is that, for example, the first bit of the master-to-slave ID of the Glink-3D master (M_DID0) is coupled to the first bit of the master-to-slave ID of the Glink-3D slaveN (M_DID0), the second bit of the master-to-slave ID of the Glink-3D master (M_DID1) is coupled to the second bit of the master-to-slave ID of the Glink-3D slaveN (M_DID1), and soon.

The parity error is occurred in condition when, for example, the total bits in the command data block is even when the parity bit type is odd. For example, the processor 105 sends the command to the slaveN. The command may include all blocks (four transmitted data blocks, two address data blocks, one command data block, and 4 received data blocks). The values of the M_DID0 to M_DID3, M_CMD0, M_CMD1, M_PAR of the Glink-3D master is different with the values of the M_DID0 to M_DID3, M_CMD0, M_CMD1, M_PAR of the Glink-3D slaveN. The values of the M_DID0 to M_DID3, M_CMD0, M_CMD1 of the Glink-3D master are 1, 0, 0, 0, 0, 1 respectively. Since the parity bit type is odd, the value of the M_PAR of the Glink-3D master is 1. Therefore, the total value (binary format) of the M_DID0 to M_DID3, M_CMD0, M_CMD1, M_PAR of the Glink-3D master is 1 which is odd. On the other hand, the values of the M_DID0 to M_DID3, M_CMD0, M_CMD1, M_PAR of the Glink-3D slaveN are 1, 1, 0, 0, 0, 1, 1 respectively. The total value (binary format) of the M_DID0 to M_DID3, M_CMD0, M_CMD1, M_PAR of the Glink-3D slaveN is 0 which is even. Therefore, the parity error is occurred, in which the parity error represents the errored command received by the slaveN.

In this embodiment, the slave device is further configured to receive the errored command and to respond the errored command according to read or write operation. Since the blocks of the Glink-3D master and the Glink-3D slaveN during write operation have different values with the blocks of the Glink-3D master and the Glink-3D slaveN during read operation, the slaveN device responds differently between the command sent by the processor 105 during write operation and the command sent by the processor 105 during read operation. The different response of the slaveN device between write operation and read operation and the corresponding response from the processor 105 will be described further in the following embodiments. Moreover, the slaveN device with corresponding Glink-3D slaveN is used as example to simplify the description. The other slave devices with the corresponding Glink-slaves are also performed as identical as the slaveN device with the corresponding Glink-3D slaveN.

In another embodiment, during read operation, the slave device (i.e., slaveN device) is further configured to send data to the master device (i.e., processor 105) according to the command received from the master device (i.e., processor 105), and the other slave devices (i.e., slaveK device) are further configured to send other data to the master device (i.e., processor 105) according to the command received from the master device (i.e., processor 105).

For example, the slaveN device and the slaveK device have the ID values "1000" and "0100" respectively. The write operation and the read operation have the values "01". The parity bit type is even. The processor 105 reads the address 0 of the slaveN device or the slaveK device. Therefore, for example, during read operation to the slaveN device, all values of the first T_D0 to T_D15 including corresponding parity bit of the address data block of the Glink-3D master are 0, all values of the second T_D0 to T_D15 including corresponding parity bit of the address data block of the Glink-3D master are 0, and values of the S_DID0 to S_DID3, S_CMD0, S_CMD1, S_PAR of the command data block of the Glink-3D master are 1, 0, 0, 0, 0, 1, 0. It means that the processor 105 sends the command of the read operation to address 0 of the slaveN device.

In response to the processor 105 sending the command of the read operation to the slaveN device, the slaveN device sends the data to the processor 105. For example, the data has 64 bits which is divided into 4 blocks. All values of the data of the address 0 of the slaveN device including the parity bit are 0. Therefore, all values of the first T_D0 to T_D15 (first main data) including corresponding parity bit (first parity bit) of the data block of the Glink-3D slaveN are 0, all values of the second T_D0 to T_D15 (second main data) including corresponding parity bit (second parity bit) of the data block of the Glink-3D slaveN are 0, all values of the third T_D0 to T_D15 (third main data) including corresponding parity bit (third parity bit) of the data block of the Glink-3D slaveN are 0, and all values of the fourth T_D0 (fourth main data) to T_D15 including corresponding parity bit (fourth parity bit) of the data block of the Glink-3D slaveN are 0. It means that the slaveN device sends the data of the address 0 to the processor 105 in response to the command of the read operation sent by the processor 105.

Another example, during read operation to the slaveK device, all values of the first T_D0 to T_D15 including corresponding parity bit of the address data block of the Glink-3D master are 0, all values of the second T_D0 to T_D15 including corresponding parity bit of the address data block of the Glink-3D master are 0, and values of the S_DID0 to S_DID3, S_CMD0, S_CMD1, S_PAR of the command data block of the Glink-3D master are 0, 1, 0, 0, 0, 1, 0. It means that the processor 105 send the command of the read operation to address 0 of the slaveK device.

In response to the processor 105 sending the command of the read operation to the slaveK device, the slaveK device sends the data to the processor 105. For example, the data has 64 bits which is divided into 4 blocks. All values of the data of the address 0 of the slaveK device including the parity bit are 0. Therefore, all values of the first T_D0 to T_D15 including corresponding parity bit of the data block of the Glink-3D slaveK are 0, all values of the second T_D0 to T_D15 including corresponding parity bit of the data block of the Glink-3D slaveK are 0, all values of the third T_D0 to T_D15 including corresponding parity bit of the data block of the Glink-3D slaveK are 0, and all values of the fourth T_D0 to T_D15 including corresponding parity bit of the data block of the Glink-3D slaveK are 0. It means that the slaveK device sends the data of the address 0 to the processor 105 in response to the command of the read operation sent by the processor 105.

In the embodiment, the command has higher protection than the data/the other data. The command includes, for example, 1 parity bit for 6 bits of command. On the other hand, the data includes, for example, 1 parity bit for 16 bits of the data. For instance, referring to FIG. 9, the command data block of the Glink-3D master includes 4 bits of master-to-slave ID (M_DID0 to M_DID3), 2 bits of read/write (R/W) command (M_CMD0, M_CMD1), and 1 bit of parity (M_PAR). The command data block of the Glink-3D master also includes 4 bits of slave-to-master ID (S_DID0 to S_DID3), 2 bits of read/write (R/W) command (S_CMD0, S_CMD1), and 1 bit of parity (S_PAR). That is, for write operation, the command includes 1 bit of parity (M_PAR), 4 bits of master-to-slave ID (M_DID0 to M_DID3), and 2 bits of read/write (R/W) command (M_CMD0, M_CMD1). And for read operation, the command includes 1 bit of parity (S_PAR), 4 bits of slave-to-master ID (S_DID0 to S_DID3), and 2 bits of read/write (R/W) command (S_CMD0, S_CMD1). On the other hand, for example, the transmitted data block of the Glink-3D master includes 16 bits of transmitted data (T_D0 to T_D15) and 1 bit of parity (T_PAR). That is, the data includes 1 bit of parity (T_PAR) and for 16 bits of transmitted data (T_D0 to T_D15). In other words, the command includes 1 parity bit for 6 bits of ID and R/W command, and the data/the other data includes 1 parity bit for 16 bits of data. That is, the protection of the command is higher than the protection of the data.

In the embodiment, the slave device (i.e., slaveN device) sends an intentional error data to the master device (i.e., processor 105) in response to the errored command received by the slave device (i.e., slaveN device), and the other slave devices (i.e., slaveK device) send other intentional error data to the master device (i.e., processor 105) in response to the errored command received by the other slave devices (i.e., slaveN device). The data/the other data and the intentional error data/the other intentional error data comprise one or more main data and a parity bit. The intentional error data/the other intentional error data are generated by inverting the parity bit of the data/the other data.

For example, during read operation to the slaveN device, the processor 105 sends the command of the read operation to address 0 of the slaveN device. Since the data configuration in the Glink-3D master has been described, the description will not be repeated thereafter. Since the slaveN device receives the errored command, therefore, for example, the values in the Glink-3D slaveN is different with the values in the Glink-3D master. For instance, the values of the S_DID0 to S_DID3, S_CMD0, S_CMD1, SPAR of the command data block of the Glink-3D slaveN are 0, 1, 0, 0, 0, 1, 1 which have the total value (binary format) 1. Since the parity bit type is even which is 0, therefore the total value 1 means that the parity error has occurred. This occurrence of parity error represents the errored command.

In response to the errored command received by the slaveN device, the slaveN device sends the intentional error data to the processor 105. The intentional error data includes one or more main data and a parity bit. The intentional error data is generated by inverting the parity bit of the data. The intentional error data, for example, includes all values of the first T_D0 to T_D15 (first main data) of the data block of the Glink-3D slaveN are 0 and the corresponding parity bit (first parity bit) is 1, all values of the second T_D0 to T_D15 (second main data) of the data block of the Glink-3D slaveN are 0 and the corresponding parity bit (second parity bit) is 1, all values of the third T_D0 to T_D15 (third main data) of the data block of the Glink-3D slaveN are 0 and the corresponding parity bit (third parity bit) is 1, and all values of the fourth T_D0 to T_D15 (fourth main data) of the data block of the Glink-3D slaveN are 0 and the corresponding parity bit (fourth parity bit) is 1. That is, the intentional error data includes the main data and the parity bit, and the intentional error data is generated by inverting the parity bit.

Another example, during read operation to the slaveK device, the processor 105 sends the command of the read operation to address 0 of the slaveK device. Since the slaveN device receives the errored command, therefore, for example, the values in the Glink-3D slaveN is different with the values in the Glink-3D master. In response to the errored command received by the slaveK device, the slaveK device sends the other intentional error data to the processor 105. The other intentional error data includes one or more other main data with corresponding parity bit. The other intentional error data is generated by inverting the corresponding parity bit of the other data. The other intentional error data, for example, includes all values of the first T_D0 to T_D15 (first other main data) of the data block of the Glink-3D slaveK are 0 and the corresponding parity bit (first parity bit) is 1, all values of the second T_D0 to T_D15 (second other main data) of the data block of the Glink-3D slaveK are 0 and the corresponding parity bit (second parity bit) is 1, all values of the third T_D0 to T_D15 (third other main data) of the data block of the Glink-3D slaveK are 0 and the corresponding parity bit (third parity bit) is 1, and all values of the fourth T_D0 to T_D15 (fourth other main data) of the data block of the Glink-3D slaveK are 0 and the corresponding parity bit (fourth parity bit) is 1. That is, the other intentional error data includes the other main data with the corresponding parity bit, and the other intentional error data is generated by inverting the corresponding parity bit.

Figure 10:
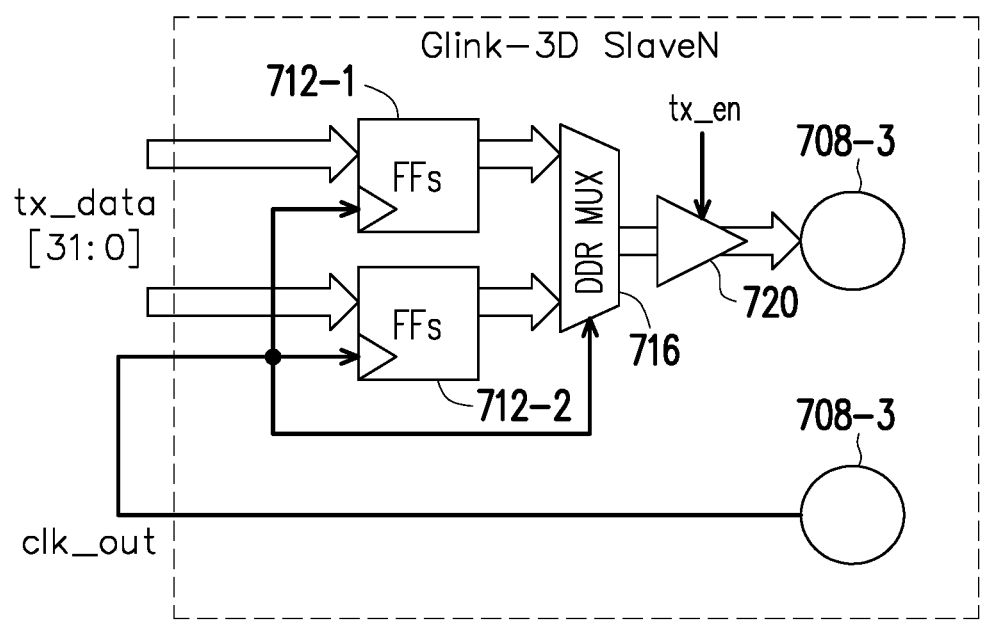
FIG. 10 schematically illustrates a schematic diagram of the DDR configuration of the slave interface according to an embodiment of the disclosure.

FIG. 10 illustrates a schematic diagram of the DDR configuration of the slave interface according to an embodiment of the disclosure. The schematic diagram of FIG. 10 includes the FFs 712-1 and 712-2, the multiplexer 716, the buffer 720, and the bonds 708-3. The FFs 712-1 and 712-2 of FIG. 10 represent the FFs 712 of FIG. 7, the multiplexer 716 of FIG. 10 represents the multiplexer 716 of FIG. 7, the buffer 720 of FIG. 10 represents the buffer 720 of FIG. 7, and the bonds 708-3 of FIG. 10 represent the bonds 708-3 of FIG. 7.

In the embodiment of FIGS. 9 and 10, the intentional error data/the other intentional error data are sent by using a double data rate (DDR) configuration. Since the DDR configuration of the intentional error data and the other intentional error data are identical, thereafter, the DDR configuration is only described with respect to the intentional error data for simplicity purpose. Moreover, in condition when the slave device and the other slave devices perform identical process, thereafter, the process is only described with respect to the slave device.

Referring to FIGS. 7, 9, and 10, the intentional error data (i.e., tx_data[31:0]) are sent to the processor 105 via the Glink-3D slaveN and the Glink-3D master by using the DDR configuration. For example, the FFs 712-1 proceeds the tx_data[31:16], and the FFs 712-2 proceeds the tx_data[15:0]. The tx_data[31:16] and the tx_data[15:0] are proceeded via the multiplexer 716 and the buffer 720 to the bonds 708-3 electrically connected with the corresponding bonds of the Glink-3D master.

Specifically, the bonds 708-3 has 4×5 (20) bonds which have the mapping data, for example, T_D0 to T_D15, T_PAR, T_LR, VDD, and VSS. The buffer 720 proceeds the tx_data[31:16] and the tx_data[15:0] consecutively. For example, the intentional error data has 0 values except for the inverted parity bit. The buffer 720 proceeds the tx_data[31:16] with corresponding lane repair bit and inverted parity bit to the bonds 708-3. And then, the buffer 720 proceeds the tx_data[15:0] with corresponding lane repair bit and inverted parity bit to the bonds 708-3. That is, the intentional error data tx_data[31:0]) are sent to the processor 105 by using the DDR configuration.

In another embodiment, the master device (i.e., processor 105) is further configured to receive an error data or the intentional error data from the slave device (i.e., slaveN device) and/or configured to receive other error data or the other intentional error data from the other slave devices (i.e., slaveK device). The one or more main data of the error data/the other error data have different values with the one or more main data of the data/the other data. The master device (i.e., processor 105) handles the intentional error data/the other intentional error data in same way as the error data/the other error data by reporting a failure of read operation.

For example, referring to FIG. 9, during read operation, all values of the first transmitted data of the Glink-3D slaveN (T_D0 to T_D15) including the parity bit (T_PAR) are 0. In condition when the error has not occurred, all values of the first received data of the Glink-3D master (R_D0 to R_D15) including the parity bit (R_PAR) are 0. However, in condition when the error has occurred, all values, except R_D15, of the first received data of Glink-3D master (R_D0 to R_D14) including the parity bit (R_PAR) are 0. Since the parity bit error type is even, the error is detected when the total values of the R_D0 to R_D15 including the R_PAR is odd. That is, for the error data, the value of R_D15 when the error has not occurred is different with the value of R_D15 when the error has occurred.

On the other hand, during read operation, since the parity bit error type is even, all values of the first transmitted data of the Glink-3D slaveN (T_D0 to T_D15) are 0 and the value of the parity bit (T_PAR) is 1. In other words, in condition when the intentional error has been generated, all values of the first received data of Glink-3D master (R_D0 to R_D15) are 0 and the value of the parity bit (R_PAR) is 1. The error is detected when the total values of the R_D0 to R_D15 including the R_PAR is odd. That is, for the intentional error data, the value of T_PAR is inverted when the intentional error has been occurred, as such, the parity error has been detected by the processor 105. Therefore, the processor 105 reports the error, either caused by the error data or caused by the intentional error data, as the read operation failure.

In another embodiment, the command includes one or more address data with corresponding address data parity bit, and a read command and identification (ID) data with corresponding read command and ID data parity bit. The command and the errored command have different values in the one or more address data with corresponding address data parity bit, and/or the read command and identification (ID) data with corresponding read command and ID data parity bit. In response to the errored command received from the master device (i.e., processor 105), the slave device/the other slave devices (i.e., slaveN device, slaveK device) do not read the data/the other data of the slave device/the other slave devices (i.e., slaveN device, slaveK device), and the slave device/the other slave devices (i.e., slaveN device, slaveK device) send the intentional error data/the other intentional error data to the master device (i.e., processor 105).

For example, referring to FIG. 9, the command in the Glink-3D master includes two address data blocks (add_cnt [31:0], add_cnt[63:32]) and one command data block. Each of the first address data block add_cnt[31:0] and the second address block add_cnt[63:32] includes the transmitted address data (T_D0 to T_D15), the parity bit (T_PAR), the lane repair bit (T_LR), and VSS and VDD. Since the command data block has been described, thereafter, the description will not be repeated. On the other hand, the command in the Glink-3D slaveN includes two address data blocks (add_cnt[31:0], add_cnt[63:32]) and one command data block. Each of the first address data block add_cnt[31:0] and the second address block add_cnt[63:32] includes the received address data (R_D0 to R_D15), the parity bit (R_PAR), the lane repair bit (R_LR), and VSS and VDD.

During read operation, when the error is occurred, the Glink-3D slaveN receives the errored command instead of the command. For example, all values in the first address data T_D0 to T_D15 including the parity bit T_PAR of the first address data block add_cnt[31:0] of the Glink-3D master are 0. And all values in the command data block with corresponding parity bit of the Glink-3D master are 0. On the other side, all values, except R_D15, in the first address data R_D0 to R_D14 including the parity bit R_PAR of the first address data block add_cnt[31:0] of the Glink-3D slaveN are 0. And all values in the command data block with corresponding parity bit of the Glink-3D slaveN are 0. Since the parity bit error type is even, the slaveN device detects the command received via the Glink-3D slaveN as the errored command. That is, the command and the errored command have different values in the one or more address data with corresponding address data parity bit.

Another example, all values in the first address data block add_cnt[31:0] and the second address data block add_cnt [63:32] of the Glink-3D master are 0. And all values of the master-to-slave ID S_DID0 to S_DID3, the read command S_CMD0 and S_CMD1, and the parity bit S_PAR of the Glink-3D master are 0. On the other side, all values in the first address data block add_cnt[31:0] and the second address data block add_cnt[63:32] of the Glink-3D slaveN are 0. And all values, except S_DID3, of the master-to-slave ID S_DID0 to S_DID2, the read command S_CMD0 and S_CMD1, and the parity bit S_PAR of the Glink-3D slaveN are 0. Since the parity bit error type is even, the slaveN device detects the command received via the Glink-3D slaveN as the errored command. That is, the command and the errored command have different values in the read command and ID data with corresponding read command and ID data parity bit.

In response to the errored command received by the slaveN device, the slaveN device does not read the data of the address 0 as sent by the processor 105. As described above, the address received by the slaveN device has been changed which represents the wrong address, and/or the slave ID received by the slaveN device has been changed which represents the wrong slave ID. Therefore, the slaveN device generates the intentional error data and sends the intentional error data to the processor 105.

In another embodiment, the master device (i.e., processor 105) receives the intentional error data/the other intentional error data sent by the slave device/the other slave devices (i.e., slaveN device, slaveK device). For example, in response to the intentional error data sent by the slaveN device via the Glink-3D slaveN, the processor 105 receives the intentional error data via the Glink-3D master.

In another embodiment, the master device (i.e., processor 105) further includes a master device interrupt and a master error counter, the slave device (i.e., slaveN device) further includes a slave device interrupt and a slave device error counter, the other slave devices (i.e., slaveK device) further includes other slave devices interrupts and other slave devices error counters. In response to that the master device (i.e., processor 105) receives the intentional error data/the other intentional error data, the master device (i.e., processor 105) sets the master device interrupt and increments the master error counter, and the slave device/the other slave devices (i.e., slaveN device, slaveK device) set the slave device interrupt/the other slave devices interrupts and increment the slave device error counter/the other slave devices error counters.

The master device interrupt/the slave device interrupt/the other slave devices interrupts maybe the interrupt to the data protection system (i.e., 300). The master device interrupt/the slave device interrupt/the other slave devices interrupts maybe the interrupt for the currently executing code. The master device interrupt may be applied for interruption for the processor 105 to read the data from the slave devices. The master device interrupt may be performed by restarting the data protection system (i.e., 300) and resetting the read FIFO (i.e., FFs 703-1 to 703-3). The slave device interrupt/ the other slave devices interrupts may be applied for interruption for, for example, the slaveN device/the slaveK device to read the data of the corresponding address. The master device interrupt/the slave device interrupt/the other slave devices interrupts may be implemented by setting the corresponding interrupt bit/flag. The master error counter may be implemented in response to the interrupt generated by the processor 105. The slave device error counter/the other slave devices error counters may be implemented in response to the interrupt generated by the, for example, slaveN device/the slaveK device. The master error counter/ the slave device error counter/the other slave devices error counters may be implemented as bit/flag.

For example, during read operation, the processor 105 send the read command to the slaveN device to read the address 0. However, since the error has occurred, the slaveN device receives the errored command. In response thereto, the slaveN device generates the intentional error data and sends the intentional error data to the processor 105. The processor 105 receives the intentional error data sent by the slaveN device. The processor 105 recognizes that the data received from the slaveN is error by, for example, checking the parity error. In response thereto, the processor 105 sets the master interrupt flag and increments the corresponding master error counter. Accordingly, the slaveN device sets the slave device interrupt flag and increments the corresponding slave error counter.

In another embodiment, the command includes one or more write data with corresponding write data parity bit, one or more address data with corresponding address data parity bit, and a write command and identification (ID) data with corresponding write command and ID data parity bit. The command and the errored command have different values in the one or more write data with corresponding write data parity bit, and/or the one or more address data with corresponding address data parity bit, and/or the write command and identification (ID) data with corresponding write command and ID data parity bit. During write operation, in response to the errored command received from the master device (i.e., processor 105), the slave device/the other slave devices (i.e., slaveN device, slaveK device) do not execute the errored command to prevent the one or more write data to be written to the slave device/the other slave devices (i.e., slaveN device, slaveK device).

Referring to FIG. 9, for example, during write operation, the processor 105 sends the command to the slaveN device. The command includes the transmitted data blocks tx_data [31:0] to tx_data[127-96] with corresponding parity bit (T_D0 to T_D15, T_PAR) for each transmitted data block, the address data blocks add_cnt[31:0] to add_cnt[63:32] with corresponding parity bit (T_D0 to T_D15, T_PAR) for each address data block, and the command data block with corresponding parity bit for each write command (M_DID0 to M_DID3, M_CMD0, M_CMD1, M_PAR) and read command (S_DID0 to S_DID3, S_CMD0, S_CMD1, S_PAR) of the Glink-3D master. All values of the transmitted data with corresponding parity bit are 0. All values of the address data with corresponding parity bit are 0. All values of the write command, except M_CMD1, with corresponding parity bit are 0. And all values of the read command with corresponding parity bit are 0. M_CMD1 having 1 value represents that the processor 105 sends the write command instead of the read command. M_DID0 to M_DID3 having 0 values represents, for example, the slaveN device. T_D0 to T_D15 of the address data blocks having 0 values represents the address 0 of slaveN device. T_D0 to T_D15 of the transmitted data blocks having 0 values represents the data 0 will be written to the address 0 of the slaveN device.

In condition when the error has occurred, the Glink-3D slaveN receives the errored command. Since the command sent by the processor 105 has 0 values of the transmitted data, the Glink-3D slaveN receives the received data (i.e., except R_D15 of the first received data block) having 0 values when the error has occurred. That is, the Glink-3D slaveN receives the errored command having the different value of, for example, R_D15 of the first received data block with the value of T_D15 of the first transmitted data block. The error may be not always occurred in the received data, the error may be occurred in the address data, the write ID, the write command, the parity bit, or the combination thereof.

In response to the errored command (i.e., R_D15 of the first received data block having different value with T_D15 of the first transmitted data block) received by the slaveN device, the slaveN device does not execute the command sent by the processor 105. The slaveN device does not write the received data R_D0 to R_D15 of all the received data blocks to the address 0 of the slaveN device. By doing so, the command having, for example, error data can be prevented to be written to the slaveN device.

In another embodiment, the slave device/the other slave devices (i.e., slaveN device, slaveK device) further include a slave device interrupt/other slave devices interrupts and a slave device error counter/other slave devices error counters. The slave device/the other slave devices (i.e., slaveN device, slaveK device) drop the errored command, set the slave device interrupt/the other slave devices interrupts, and increment the slave device error counter/the other slave devices error counters in response to that the slave device/the other slave devices (i.e., slaveN device, slaveK device) do not execute the errored command.

For example, the slave device interrupt/the other slave devices interrupts maybe the interrupt to the data protection system. The slave device interrupt/the other slave devices interrupts maybe the interrupt for the currently executing code. The slave device interrupt/the other slave devices interrupts may be applied for interruption for, for example, the slaveN device/the slaveK device to write the data to the corresponding address. The slave device interrupt/the other slave devices interrupts may be implemented by setting the corresponding interrupt bit/flag. The slave device error counter/the other slave devices error counters may be implemented in response to the interrupt generated by the, for example, slaveN device/the slaveK device. The slave device error counter/the other slave devices error counters may be implemented as bit/flag.

The slaveN device drops the command having, for example, the error data R_D15. The slaveN device increments the slave device error counter by, for example, adding the slave device error counter by 1 in response to that the slaveN device does not execute the command having, for example, the error data R_D15. By incrementing the device error counter, the slaveN device records the number of error occurred for write operation and/or read operation.

Figure 11:
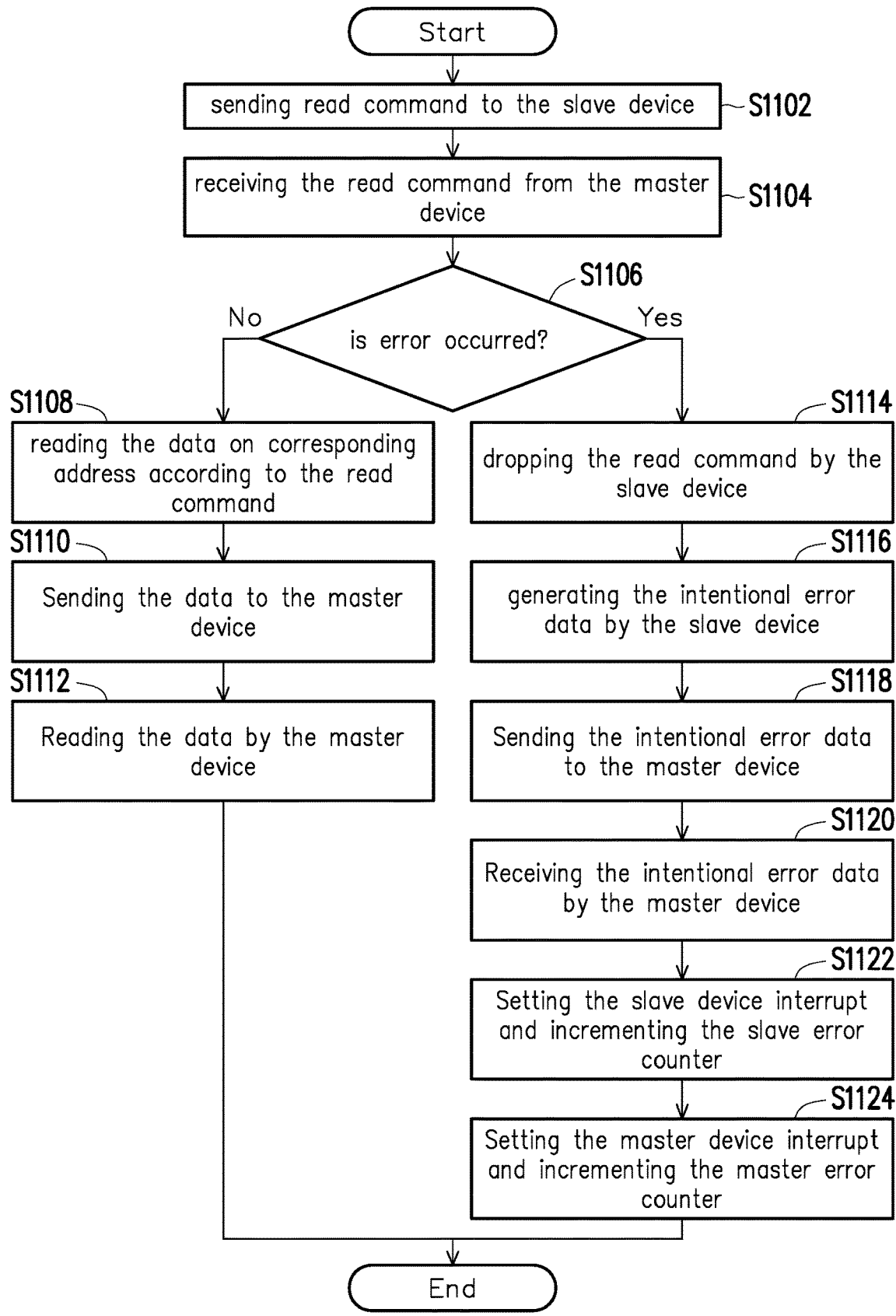
FIG. 11 schematically illustrates an interface method according to an embodiment of the disclosure.

FIG. 11 schematically illustrates an interface method according to an embodiment of the disclosure.

In the embodiment of FIG. 11, the data protection method for handling the errored command during, for example, read operation includes step S1102 to step S1124. A master device includes a master interface. A slave device includes a slave interface. The master interface and the slave interface are electrically connected via one or plurality of bonds and/or TSVs and configured for interfacing between the master device and the slave device.

In the step S1102, sending the read command to the slaveN device. In the step S1104, receiving the read command from the processor 105. In the step S1106, the slaveN device checking whether the error has occurred by, for example, checking the parity error. If the error has not occurred, in the step S1108, reading the data on the corresponding address of the slaveN device according to the read command. In the step S1110, sending the data read by the slaveN device to the processor 105. In the step S1112, reading the data by the processor 105. If the error in the step S1106 is occurred, in the step S1114, dropping the read command by the slaveN device. In the step S1116, generating the intentional error data by the slaveN device. In the step S1118, sending the intentional error data to the processor 105. In the step S1120, receiving the intentional error data to the processor 105. In the step S1122, setting the slaveN device interrupt and incrementing the slaveN error device counter. In the step S1124, setting the processor device interrupt and incrementing the processor error counter. That is, during read operation, the slaveN device and the processor 105 set the corresponding interrupt and increment the corresponding error counter.

In summary, the data protection system and the data protection method are provided. The data protection system includes the master device and the plurality of slave devices. The master device communicates with the plurality of slave devices via the master interface and the slave interfaces. During read operation, in condition when the error has occurred, the slave device receives the errored command. In response to the errored command received by the slave device, the slave device do not execute the command and accordingly sets the corresponding interrupt and increments the corresponding error counter. Accordingly, the slave device generates the intentional error data and sends the intentional error data to the master device. The master device receives the intentional error data and accordingly sets the corresponding interrupt and increments the corresponding error counter. During write operation, in condition when the error has occurred, the slave device receives the errored command. In response to the errored command received by the slave device, the slave device do not execute the command and accordingly sets the corresponding interrupt and increments the corresponding error counter. That is, during read operation, by distinguishing the errored command, the slave device generates the intentional error data. Accordingly, by distinguishing the intentional error data received by the master device, the data protection system performs protection to the data transceived between the master device and the plurality of slave devices.

In another embodiment, a data protection system for handling an errored command includes a master device and a slave device. The master device is configured to send command. The slave device is coupled to the master device and configured to receive the command from the master device. The master device includes a master interface. The slave device includes a slave interface. The master interface and the slave interface are electrically connected via one or plurality of bonds and/or TSVs and configured for interfacing between the master device and the slave device. The errored command represents the command having a parity error. The slave device is further configured to receive the errored command and to respond the errored command according to read or write operation.

In another embodiment, the data protection system further includes other slave devices. The other slave devices are coupled to other slave interfaces in one-to-one relationship and configured to receive the command from the master device. The other slave interfaces are electrically connected to the master interface by the one or plurality of bonds and/or TSVs. The other slave devices are further configured to receive the errored command and to respond the errored command according to read or write operation.

In another embodiment, during read operation, the slave device is further configured to send data to the master device according to the command received from the master device. The other slave devices are further configured to send other data to the master device according to the command received from the master device. The command has higher protection than the data/the other data. The slave device sends an intentional error data to the master device in response to the errored command received by the slave device. The other slave devices send other intentional error data to the master device in response to the errored command received by the other slave devices. The data/the other data and the intentional error data/the other intentional error data comprise one or more main data and a parity bit. The intentional error data/the other intentional error data are generated by inverting the parity bit of the data/the other data.

In another embodiment, the intentional error data/the other intentional error data are sent by using a double data rate (DDR) configuration. In another embodiment, the master device is further configured to receive an error data or the intentional error data from the slave device and/or configured to receive other error data or the other intentional error data from the other slave devices. The one or more main data of the error data/the other error data have different values with the one or more main data of the data/the other data. The master device handles the intentional error data/the other intentional error data in same way as the error data/the other error data by reporting a failure of read operation.

In another embodiment, the command includes one or more address data with corresponding address data parity bit, and a read command and identification (ID) data with corresponding read command and ID data parity bit. The command and the errored command have different values in the one or more address data with corresponding address data parity bit, and/or the read command and identification (ID) data with corresponding read command and ID data parity bit. In response to the errored command received from the master device, the slave device/the other slave devices do not read the data/the other data of the slave device/the other slave devices, and the slave device/the other slave devices send the intentional error data/the other intentional error data to the master device.

In another embodiment, the master device receives the intentional error data/the other intentional error data sent by the slave device/the other slave devices. In another embodiment, the master device further includes a master device interrupt and a master error counter. The slave device further includes a slave device interrupt and a slave device error counter. The other slave devices further includes other slave devices interrupts and other slave devices error counters. In response to that the master device receives the intentional error data/the other intentional error data, the master device sets the master device interrupt and increments the master error counter, and the slave device/the other slave devices set the slave device interrupt/the other slave devices interrupts and increment the slave device error counter/the other slave devices error counters.

In another embodiment, the command includes one or more write data with corresponding write data parity bit, one or more address data with corresponding address data parity bit, and a write command and identification (ID) data with corresponding write command and ID data parity bit. The command and the errored command have different values in the one or more write data with corresponding write data parity bit, and/or the one or more address data with corresponding address data parity bit, and/or the write command and identification (ID) data with corresponding write command and ID data parity bit. During write operation, in response to the errored command received from the master device, the slave device/the other slave devices do not execute the errored command to prevent the one or more write data to be written to the slave device/the other slave devices.

In another embodiment, the slave device/the other slave devices further include a slave device interrupt/other slave devices interrupts and a slave device error counter/other slave devices error counters. The slave device/the other slave devices drop the errored command, set the slave device interrupt/the other slave devices interrupts, and increment the slave device error counter/the other slave devices error counters in response to that the slave device/the other slave devices do not execute the errored command.

In another embodiment, a data protection method for handling an errored command includes some steps. A master device includes a master interface. A slave device includes a slave interface. The master interface and the slave interface are electrically connected via one or plurality of bonds and/or TSVs and configured for interfacing between the master device and the slave device. The steps are sending command by a master interface and receiving, by a slave interface, the command from the master device. The errored command represents the command having a parity error. Receiving the errored command and responding the errored command by the slave device are performed according to read or write operation.

In another embodiment, the data protection method, further includes receiving the errored command and responding the errored command by other slave devices according to read or write operation.

In another embodiment, during read operation, sending data to the master device is performed by the slave device according to the command received from the master device, and sending other data to the master device are performed by the other slave devices according to the command received from the master device. The command has higher protection than the data/the other data. Sending an intentional error data to the master device is performed by the slave device in response to receiving the errored command by the slave device, and sending other intentional error data to the master device by the other slave devices in response to receiving the errored command by the other slave devices. The data/the other data and the intentional error data/the other intentional error data comprise one or more main data and a parity bit. The intentional error data/the other intentional error data are generated by inverting the parity bit of the data/the other data.

In another embodiment, the intentional error data/the other intentional error data are sent by using a double data rate (DDR) configuration. In another embodiment, receiving an error data or the intentional error data from the slave device and/or receiving other error data or the other intentional error data from the other slave devices are performed by the master device. The one or more main data of the error data/the other error data have different values with the one or more main data of the data/the other data. Handling the intentional error data/the other intentional error data in same way as handling the error data/the other error data is performed by the master device by reporting a failure of read operation.

In another embodiment, the command includes one or more address data with corresponding address data parity bit, and a read command and identification (ID) data with corresponding read command and ID data parity bit. The command and the errored command have different values in the one or more address data with corresponding address data parity bit, and/or the read command and identification (ID) data with corresponding read command and ID data parity bit. In response to the errored command received from the master device, reading the data/the other data of the slave device/the other slave devices is not performed by the slave device/the other slave devices, and sending the intentional error data/the other intentional error data to the master device is performed by the slave device/the other slave devices.

In another embodiment, receiving the intentional error data/the other intentional error data sent by the slave device/the other slave devices is performed by the master device. In another embodiment, the master device further includes a master device interrupt and a master error counter. The slave device further includes a slave device interrupt and a slave device error counter. The other slave devices further include other slave devices interrupts and other slave devices error counters. In response to that receiving the intentional error data/the other intentional error data is performed by the master device, setting the master device interrupt and incrementing the master error counter by the master device, and setting the slave device interrupt/the other slave devices interrupts and incrementing the slave device error counter/the other slave devices error counters by the slave device/the other slave devices.

In another embodiment, the command includes one or more write data with corresponding write data parity bit, one or more address data with corresponding address data parity bit, and a write command and identification (ID) data with corresponding write command and ID data parity bit. The command and the errored command have different values in the one or more write data with corresponding write data parity bit, and/or the one or more address data with corresponding address data parity bit, and/or the write command and identification (ID) data with corresponding write command and ID data parity bit. During write operation, in response to the errored command received from the master device, executing the errored command to prevent the one or more write data to be written to the slave device/the other slave devices is not performed by the slave device/the other slave devices.

In another embodiment, the slave device/the other slave devices further includes a slave device interrupt/other slave devices interrupts and a slave device error counter/other slave devices error counters. Dropping the errored command, setting the slave device interrupt/the other slave devices interrupts, and incrementing the slave device error counter/the other slave devices error counters are performed by the slave device/the other slave devices in response to that executing the errored command is not performed by the slave device/the other slave devices.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A data protection system for handling an errored command, comprising:
    a master device, configured to send a command; and
    a slave device, coupled to the master device, configured to receive the command from the master device, wherein
    the master device comprises a master interface, the slave device comprises a slave interface, and the master interface and the slave interface are electrically connected via one or a plurality of bonds and/or through-silicon-vias (TSVs) and configured for interfacing between the master device and the slave device,
    the errored command comprises the command having a parity or other error,
    the slave device is further configured to receive the errored command and to respond to the errored command according to a read operation or a write operation,
    during the read operation, the slave device is further configured to send data to the master device according to the command received from the master device, wherein the command has higher protection than the data,
    the slave device sends intentional error data to the master device in response to the errored command received by the slave device,
    the data and the intentional error data comprise main data and a parity bit, and
    the intentional error data is generated by inverting the parity bit of the data.

2. The data protection system of claim 1, further comprising other slave devices, coupled to other slave interfaces in one-to-one relationship, configured to receive the command from the master device, wherein the other slave interfaces are electrically connected to the master interface by the one or the plurality of bonds and/or TSVs, wherein the other slave devices are further configured to receive the errored command and to respond to the errored command according to the read operation or the write operation.

3. The data protection system of claim 2, wherein, during the read operation, the other slave devices are further configured to send other data to the master device according to the command received from the master device, wherein the command has higher protection than the other data, wherein the other slave devices send other intentional error data to the master device in response to the errored command received by the other slave devices, wherein the other data and the other intentional error data comprise main data and a parity bit, wherein the other intentional error data is generated by inverting the parity bit of the other data.

4. The data protection system of claim 3, wherein the intentional error data and/or the other intentional error data are sent by using a double data rate (DDR) configuration.

5. The data protection system of claim 3, wherein the master device is further configured to receive error data or the intentional error data from the slave device and/or configured to receive other error data or the other intentional error data from the other slave devices, wherein the main data of the error data and/or the other error data have different values than the main data of the data and/or the other data, wherein the master device handles the intentional error data, the other intentional error data, the error data and/or the other error data by reporting a failure of the read operation.

6. The data protection system of claim 3, wherein the command comprises address data with a corresponding address data parity bit, and a read command and identification (ID) data with a corresponding read command and an ID data parity bit, wherein the command has first values in the address data with the corresponding address data parity bit, the errored command has second values in the address data with the corresponding address data parity bit, and the first values are different from the second values, and/or wherein the command has third values in the read command and ID data with the corresponding read command and the ID data parity bit, the errored command has fourth values in the read command and ID data with the corresponding read command and the ID data parity bit, and the third values are different from the fourth values, and wherein in response to the errored command received from the master device, the slave device and/or the other slave devices do not read the data and/or the other data of the slave device and/or the other slave devices, and the slave device and/or the other slave devices send the intentional error data and/or the other intentional error data to the master device.

7. The data protection system of claim 3, wherein the master device receives the intentional error data and/or the other intentional error data sent by the slave device and/or the other slave devices.

8. The data protection system of claim 3, wherein in response to the master device receiving the intentional error data and/or the other intentional error data, the master device sets an interrupt of the master device and increments a master error counter, and the slave device and/or the other slave devices set an interrupt of the slave device and/or interrupts of the other slave devices and increment a slave device error counter and/or other slave devices error counters.

9. The data protection system of claim 2, wherein the command and the errored command comprise write data with a corresponding write data parity bit, address data with a corresponding address data parity bit, and a write command and identification (ID) data with a corresponding write command and an ID data parity bit, wherein the command and the errored command have different values in the write data with the corresponding write data parity bit, and/or the address data with the corresponding address data parity bit, and/or the write command and ID data with the corresponding write command and the ID data parity bit, wherein, during the write operation, in response to the errored command received from the master device, the slave device and/or the other slave devices do not execute the errored command to prevent the write data from being written to the slave device and/or the other slave devices.

10. The data protection system of claim 9, wherein the slave device and/or the other slave devices drop the errored command, set an interrupt of the slave device and/or interrupts of the other slave devices, and increment a slave device error counter and/or other slave devices error counters in response to the slave device and/or the other slave devices not executing the errored command.

11. A data protection method for handling an errored command, wherein a master device comprises a master interface, a slave device comprises a slave interface, and the master interface and the slave interface are electrically connected via one or a plurality of bonds and/or through-silicon-vias (TSVs) and configured for interfacing between the master device and the slave device, the data protection method comprising:

sending a command by a master interface; and receiving, by a slave interface, the command from the master device, wherein during a read operation, sending data to the master device is performed by the slave device according to the command received from the master device, wherein the errored command comprises the command having a parity error, receiving the errored command and responding to the errored command by the slave device are performed according to the read operation or a write operation, the command has higher protection than the data, sending intentional error data to the master device is performed by the slave device in response to receiving the errored command by the slave device, the data and the intentional error data comprise main data and a parity bit, and the intentional error data is generated by inverting the parity bit of the data.

12. The data protection method of claim 11, further comprising receiving the errored command and responding to the errored command by other slave devices according to the read operation or the write operation.

13. The data protection method of claim 12, wherein, during the read operation, sending other data to the master device is performed by the other slave devices according to the command received from the master device, wherein the command has higher protection than the other data,
wherein sending other intentional error data to the master device by the other slave devices is performed in response to receiving the errored command by the other slave devices,
wherein the other data and the other intentional error data comprise main data and a parity bit,
wherein the other intentional error data are generated by inverting the parity bit of the other data.

14. The data protection method of claim 13, wherein the intentional error data and/or the other intentional error data are sent by using a double data rate (DDR) configuration.

15. The data protection method of claim 13, wherein receiving error data or the intentional error data from the slave device and/or receiving other error data or the other intentional error data from the other slave devices are performed by the master device,
wherein the main data of the error data and/or the other error data have different values than the main data of the data and/or the other data, and
wherein handling the intentional error data and/or the other intentional error data and handling the error data and/or the other error data are performed by the master device by reporting a failure of the read operation.

16. The data protection method of claim 13, wherein the command comprises address data with a corresponding address data parity bit, and a read command and identification (ID) data with a corresponding read command and an ID data parity bit,
wherein the command has first values in the address data with the corresponding address data parity bit, the errored command has second values in the address data with the corresponding address data parity bit, and the first values are different from the second values, and/or
wherein the command has third values in the read command and ID data with the corresponding read command and the ID data parity bit, the errored command has fourth values in the read command and ID data with the corresponding read command and the ID data parity bit, and the third values are different from the fourth values, and
wherein in response to the errored command received from the master device, reading the data and/or the other data of the slave device and/or the other slave devices is not performed by the slave device and/or the other slave devices, and sending the intentional error data and/or the other intentional error data to the master device is performed by the slave device and/or the other slave devices.

17. The data protection method of claim 13, wherein receiving the intentional error data and/or the other intentional error data sent by the slave device and/or the other slave devices is performed by the master device.

18. The data protection method of claim 13,
wherein in response to the master device receiving the intentional error data and/or the other intentional error data by the master device, setting an interrupt of the master device and incrementing a master error counter is performed by the master device, and setting an interrupt of the slave device and/or interrupts of the other slave devices and incrementing a slave device error counter and/or other slave devices error counters are performed by the slave device and/or the other slave devices.

19. The data protection method of claim 12, wherein the command and the errored command comprise write data with a corresponding write data parity bit, address data with a corresponding address data parity bit, and a write command and identification (ID) data with a corresponding write command and an ID data parity bit,
wherein the command and the errored command have different values in the write data with the corresponding write data parity bit, and/or the address data with the corresponding address data parity bit, and/or the write command and ID data with the corresponding write command and the ID data parity bit,
wherein, during the write operation, in response to the errored command received from the master device, the slave device and/or the other slave devices do not execute the errored command to prevent the write data from being written to the slave device and/or the other slave devices.

20. The data protection method of claim 19,
wherein dropping the errored command, setting an interrupt of the slave device and/or interrupts of the other slave devices, and incrementing a slave device error counter and/or other slave devices error counters are performed by the slave device and/or the other slave devices in response to not executing the errored command by the slave device and/or the other slave devices.

* * * * *